UNITED STATES PATENT OFFICE.

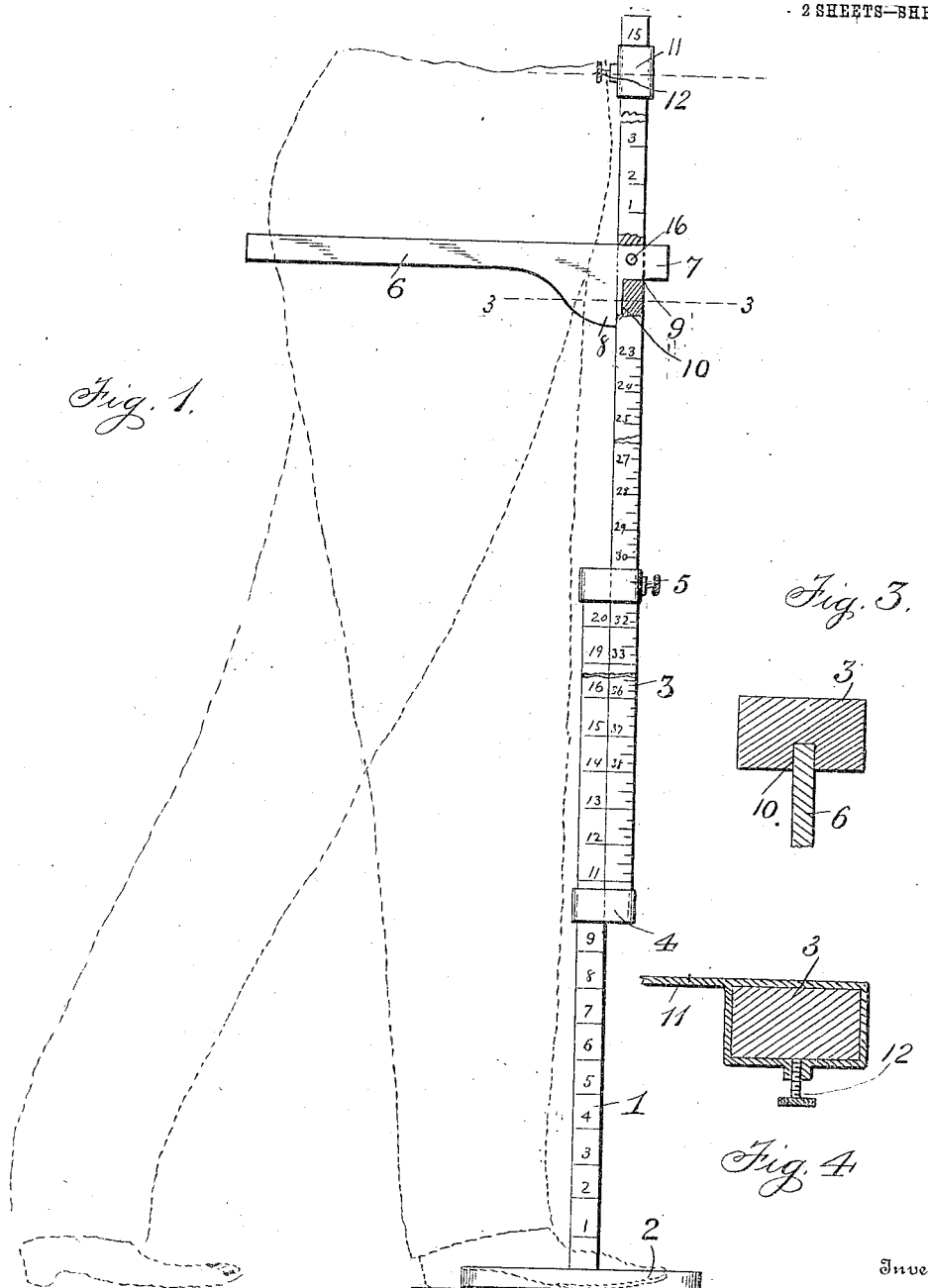

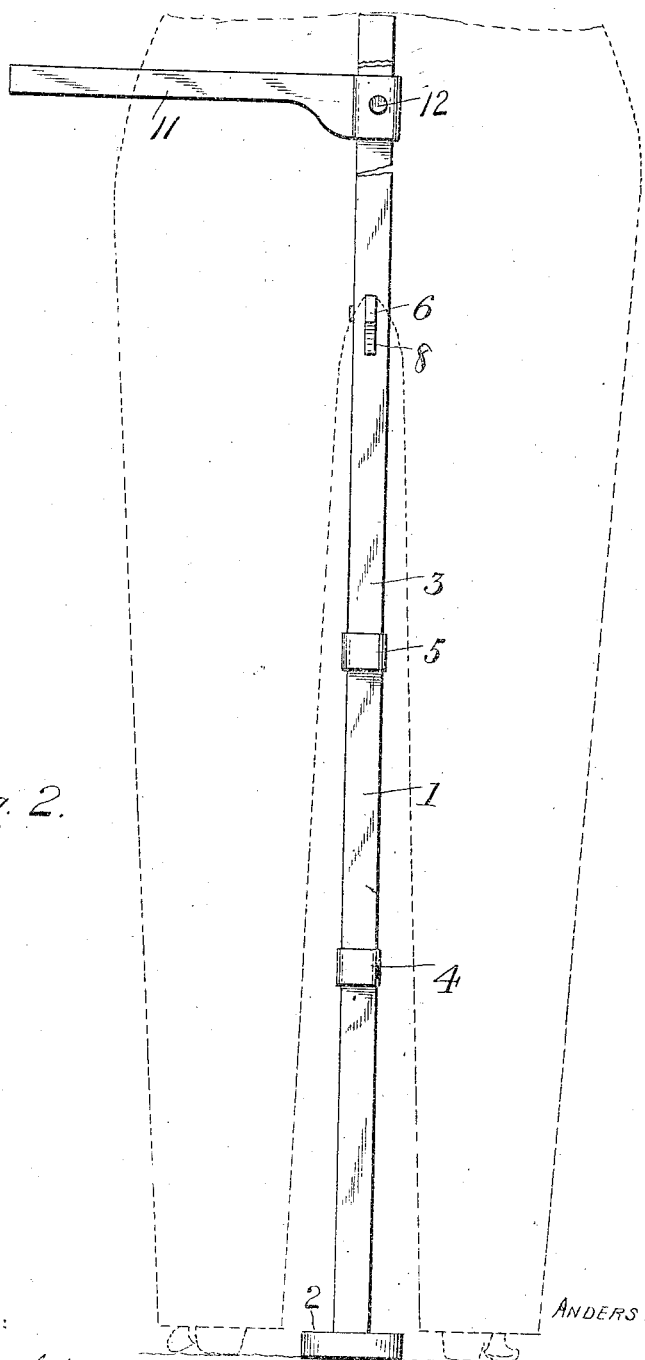

ANDERS BERNHARD REESBERG, OF TIPTON, IOWA.

TAILOR'S MEASURE.

950,403.  Specification of Letters Patent.  Patented Feb. 22, 1910.

Application filed June 3, 1907. Serial No. 376,938.

*To all whom it may concern:*

Be it known that I, ANDERS BERNHARD REESBERG, a citizen of the United States, residing at Tipton, in the county of Cedar and State of Iowa, have invented certain new and useful Improvements in Tailors' Measures, of which the following is a specification.

My invention relates to an improvement in tailors' measures or squares, and more especially to that class of instruments used for laying off trousers.

The object of the invention is to afford facility and accuracy in obtaining measurements, and the location of parts of the trousers to accurately fit the form of the wearer.

With these objects in view, my invention consists in certain novel features of construction and combinations of parts which will be hereinafter described and pointed out in the claim.

In the accompanying drawings:—Figure 1 is a view in side elevation, the dotted lines indicating the position of the person being measured. Fig. 2 is a view taken at right angles to Fig. 1 or a front elevation. Fig. 3 is a transverse section on the line 3, 3, of Fig. 1. Fig. 4 is a horizontal section through the upper measuring arm and socket.

The invention comprises in the main an extensible standard composed of the members 1 and 3, the former of which is secured in a base 2. A collar 4 is secured to the lower end of the movable member 3, and a collar 5 is secured to the upper end of the stationary member 1, said collars being adapted to guide the member 3 in its movement up and down, and a set screw 5 is provided for holding the parts in their adjusted position.

An arm 6 is provided with a tenon 7 by which it is mortised in the hole 9 formed in the movable member 3. The arm 6 is enlarged as at 8 to brace it through the medium of a tenon 10 in the corresponding mortise formed therethrough. A pin 16 holds the arm in place.

An arm 11 is adjustably held on the standard at a point above the arm 6 by means of a set screw 12.

The standard is provided with the usual scale or indicia for taking measurements in inches and fractions of inches as shown in Fig. 1.

The lower measuring arm 6 is adapted to take the exact measurement from the crotch down, and the upper measuring arm 11 extends at right angles to the arm 6 for taking measurements from the arm 6.

In using the device, it is usually placed directly in front of the person being measured with the lower measuring arm placed between the legs, and finally adjusted up into the crotch whereby the inside length of the legs of the trousers is ascertained. The upper arm is suitably adjusted laterally to the body whereby to obtain the hip measurement which is noted from the measurement as indicated upon the member 3 between the two arms. By adding this to the inside measurement, the length will be the outside seam measurement. The length measurement for the front of the trousers will be readily observable by the scale upon the standard as indicated in Fig. 1. It will be observed from the foregoing that the measurement of the inside seam, the height that the trousers should be cut in front, and the length of the outside seam of the trousers may be effected by one adjustment.

As indicated in Fig. 1, the two scales namely at the upper and lower ends of the member 3, are independent of each other.

Having fully described my invention, what I claim as new and desire to secure by Letters Patent is:—

A tailor's measure comprising a standard made in a plurality of sections adjustably connected to each other, the uppermost section having two separate and distinct measuring scales thereon, an arm extending from the base of the upper scale and another arm adjustable upon the section along said scale.

In testimony whereof I affix my signature, in presence of two witnesses.

ANDERS BERNHARD REESBERG.

Witnesses:
ALBERT REESBERG,
R. S. POTTER.